(12) United States Patent  
Haase (10) Patent No.: US 7,538,689 B2
(45) Date of Patent: May 26, 2009

(54) METHODS AND SYSTEMS UTILIZING A PROGRAMMABLE SIGN DISPLAY LOCATED IN PROXIMITY TO A TRAFFIC LIGHT

(75) Inventor: Michael A. Haase, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 223 days.

(21) Appl. No.: 11/609,364

(22) Filed: Dec. 12, 2006

(65) Prior Publication Data

US 2007/0118395 A1 May 24, 2007

Related U.S. Application Data

(63) Continuation of application No. 10/825,063, filed on Apr. 15, 2004, now Pat. No. 7,167,106.

(51) Int. Cl.
G08G 1/07 (2006.01)
(52) U.S. Cl. .................. 340/909; 340/905; 340/906; 340/910; 340/914; 340/917; 340/908.1; 340/929; 40/453
(58) Field of Classification Search ........... 340/909, 340/905, 906, 910, 914, 917, 908.1, 929; 40/453
See application file for complete search history.

(56) References Cited

U.S. PATENT DOCUMENTS

| | | | |
|---|---|---|---|
| 2,255,055 A | 9/1941 | Halstead | |
| 4,704,610 A | 11/1987 | Smith et al. | |
| 5,133,081 A | 7/1992 | Mayo | |
| 5,150,116 A * | 9/1992 | West | 340/928 |
| 5,199,108 A | 3/1993 | Morgan et al. | |
| 5,519,390 A | 5/1996 | Casini | |
| 5,572,201 A | 11/1996 | Graham et al. | |
| 5,726,648 A | 3/1998 | Soon | |
| 5,917,431 A | 6/1999 | Sanada et al. | |
| 5,936,599 A | 8/1999 | Reymond | |
| 6,064,318 A | 5/2000 | Kirchner et al. | |
| 6,072,407 A | 6/2000 | Shin | |
| 6,104,313 A | 8/2000 | Boyd, II et al. | |
| 6,175,313 B1 | 1/2001 | Berezovsky | |
| 6,268,805 B1 | 7/2001 | Simon | |

(Continued)

FOREIGN PATENT DOCUMENTS

GB 2296121 6/1996

*Primary Examiner*—Daryl C Pope
(74) *Attorney, Agent, or Firm*—Steven A. Bern (57) ABSTRACT

Methods and systems use a programmable sign display located in proximity to a traffic light to provide information to motorists upon the motorists directing their attention toward the traffic light. The programmable sign display may receive programming for content to be displayed in various ways, such as through an interface to a telephone network accessible by a cell phone that sends programming information to the sign. The programmable sign may be used to inform motorists of a radio frequency upon which relevant information such as advertising or traffic reports is being broadcast. The programmable sign may be used to provide textual or graphical information, such as an instruction to motorists that relates to avoiding an approaching emergency vehicle. Additionally, management of the sign is provided to coordinate programming and control of the content being displayed. The display of content on the programmable sign display may be coordinated with the states of the traffic light to avoid distracting motorists.

7 Claims, 7 Drawing Sheets

U.S. PATENT DOCUMENTS

| | | |
|---|---|---|
| 6,317,058 B1 | 11/2001 | Lemelson et al. |
| 6,331,824 B1 | 12/2001 | Firestone |
| 6,380,867 B1 | 4/2002 | Maull |
| 6,633,238 B2 * | 10/2003 | Lemelson et al. ........... 340/909 |
| 6,788,252 B2 | 9/2004 | Doi |
| 6,812,855 B1 | 11/2004 | Sudou et al. |
| 6,850,169 B2 * | 2/2005 | Manavi et al. ............. 340/902 |
| 2002/0005790 A1 | 1/2002 | Georgalis |
| 2002/0008637 A1 | 1/2002 | Lemelson et al. |
| 2002/0027510 A1 | 3/2002 | Jones et al. |
| 2002/0097267 A1 | 7/2002 | Dinan et al. |
| 2003/0001830 A1 | 1/2003 | Wampler et al. |
| 2003/0004805 A1 | 1/2003 | Vaitekunas et al. |
| 2003/0020633 A1 | 1/2003 | Lee |

* cited by examiner

METHODS AND SYSTEMS UTILIZING A PROGRAMMABLE SIGN DISPLAY LOCATED IN PROXIMITY TO A TRAFFIC LIGHT

CROSS REFERENCE TO RELATED APPLICATION

This is a continuation of U.S. application Ser. No. 10/825,063, filed Apr. 15, 2004, now U.S. Pat. No. 7,167,106 now allowed, the disclosure of which is incorporated by reference in its entirety herein.

TECHNICAL FIELD

The present invention relates to programmable sign displays. More particularly, the present invention is related to programmable sign displays located in proximity to a traffic light such that the display provides information that is visible to motorists who must direct their attention toward the traffic light when operating a vehicle.

BACKGROUND

Traffic lights provide guidance to motorists approaching an intersection, on-ramp, railroad crossing, etc. by indicating to the motorist whether to pass through the intersection or stop. Motorists must obey traffic lights by law, and traffic lights are thereby useful in coordinating the flow of traffic through an intersection. Typically, a traffic light provides a green light to instruct motorists to continue through the intersection and provides a yellow light, which follows the green light, to instruct motorists to begin slowing to a stop. A red light, which follows the yellow light and precedes the green light, instructs motorist to remain stopped and not pass through the intersection. Because the traffic light can change phases at any time, motorists must repeatedly focus their attention on the traffic light when approaching and passing through an intersection.

A traffic light creates an opportunity to provide additional information to motorists because the motorists must focus their attention toward the traffic light. This is especially true during red lights when the motorist has stopped the vehicle and may focus continuously on the traffic light in anticipation of a change to a green light. To capitalize on this opportunity, it has been proposed that a programmable sign display may be located in proximity to the traffic light, such as on the same pole, so that motorists see the programmable sign display when directing attention toward the traffic light. Various uses of the programmable sign display have been proposed, such as providing advertising or providing an indication that an emergency vehicle is approaching. However, a failure to further develop or refine systems that involve the programmable display sign may have resulted in a lack of commercial acceptance.

SUMMARY

Embodiments of the present invention address these issues and others by providing methods and systems that utilize a programmable sign display located in proximity to a traffic light. The programmable sign display is visible to motorists as they direct their attention toward the traffic light, and the programmable sign display provides an opportunity to provide information to the motorists at that time. In certain embodiments, the operation of the programmable sign display may be coordinated with the operation of the traffic light so as to avoid distracting motorists when their focus should be on driving.

Various examples of using a programmable sign display located in proximity to a traffic light are provided. As one example, programming may be sent to the programmable sign display from a remote location without building an elaborate, dedicated communication network. The programmable sign display may be interfaced to an existing telephone network accessible by a wireless communication system that sends the programming to the sign from any remote location where wireless transmission capable of reaching the programmable sign display is provided. As another example, the programmable sign display may further facilitate the conveyance of information to motorists by providing an indication of a radio frequency that motorists tune in. A radio broadcast system broadcasts information such as advertising or traffic reports over the radio frequency so that motorists may hear the information once the radio frequency has been tuned in. In another example, the programmable sign display may provide textual or graphical information relating to an approaching emergency vehicle, such as the direction from which the emergency vehicle is approaching and/or an instruction on how the motorists should maneuver their vehicles to avoid the emergency vehicle. Also, a method of managing the programmable sign display may be provided whereby the content to display is provided by many customers to a managing entity who then coordinates the programming of content into the sign.

One embodiment of the present invention involves methods and systems for providing information to motorists. A programmable sign display is placed in proximity to a traffic light, and the programmable sign display provides a display of information to motorists according to programming. A wireless interface is provided between a communications network and the programmable sign display, and the wireless interface conveys programming from the communications network to the programmable sign display to provide the display of information. Thus, programming may be provided to the sign without first provisioning a special data network between the sign and a central location and without dispatching personnel to each sign to be programmed.

Another embodiment involves methods and systems for providing information to motorists. A programmable sign display is placed in proximity to a traffic light, and the programmable sign display indicates a particular radio frequency capable of reception by a radio receiver of the motorists. A radio transmitter transmits a signal on the particular radio frequency being displayed by the programmable sign display, and the signal corresponds to information relevant to motorists. Thus, motorists wishing to hear the relevant information may tune their radio receivers to the frequency being displayed so that the radio broadcast may be received and heard.

Another embodiment involves methods and systems for providing visual information to motorists regarding an approaching emergency vehicle. A programmable sign display is placed in proximity to a traffic light, and the programmable sign displays textual information relating to the approaching emergency vehicle when a display instruction is received. A receiver in proximity to the programmable sign display receives a particular signal sent from the approaching emergency vehicle upon the approaching emergency vehicle coming within range of the receiver, and the receiver generates the display instruction to the programmable sign display in response to receiving the particular signal. Thus, motorists may read the instruction and then proceed to maneuver their vehicles accordingly. In addition to or as an alternative to displaying textual information, the programmable sign display may provide graphical elements to instruct motorists, such as an arrow providing a general direction that motorists should move their vehicles to make room for the emergency vehicle to pass by.

Another embodiment is a method of providing visual information to motorists on a programmable sign display placed in proximity to a traffic light. A managing entity receives content to be displayed on the programmable sign display from a plurality of customers. The managing entity sends programming to the programmable sign display, and the programming corresponds to the content provided by the plurality of customers. The content is displayed on the programmable sign display in response to the programming received by the programmable sign display. Thus, the managing entity eliminates the need for each customer to control its own sign, and the managing entity may coordinate content to be displayed for various customers.

DETAILED DESCRIPTION

Embodiments of the present invention provide systems and methods that utilize in one or more manners a programmable sign display located in proximity to a traffic light. The programmable sign display provides a platform from which information may be conveyed to motorists. As motorists are required by law to view and obey the traffic light, the programmable sign display enables the dissemination of information to a high volume of individuals on the roadway or to nearby pedestrians. Accordingly, the programmable sign display provides an effective platform to advertise as well as to provide public service announcements including traffic and safety information. Furthermore, because most motorists have a radio receiver in their vehicles, the programmable sign display may direct consumers to specific radio stations that provide audible information to motorists in addition to the visual information being displayed by the sign.

Figure 1:
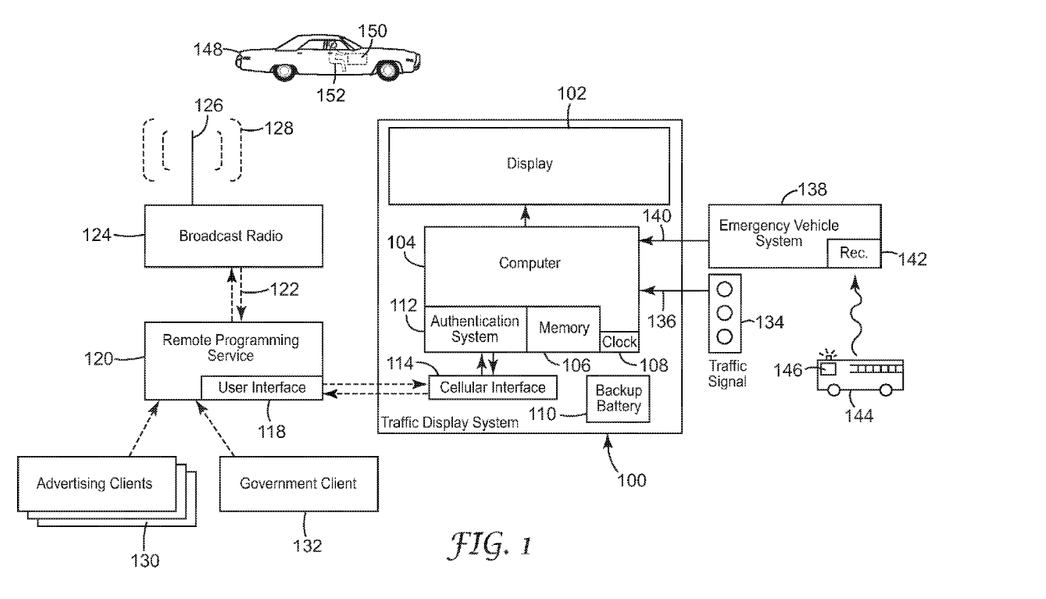
FIG. 1 illustrates main components of various exemplary systems that may be utilized in conjunction to provide a full-featured programmable sign display for viewing by motorists.

FIG. 1 shows an example of an operating environment for the programmable sign display that involves various systems working together to display content for motorists. A traffic display system 100 that is an embodiment of a programmable sign display is included to provide the display of content. The traffic display system 100 of this embodiment includes various components.

A display screen 102 is included as a component of the traffic display system 100. The display screen 102 provides the physical display of information that is viewed by motorists. The display screen 102 may be one of various technologies that are readily available such as a liquid crystal display (LCD), a light-emitting diode (LED) display, a plasma display, a direct view or projection based cathode ray tube display, or other display technology. However, one of the brighter technologies such as LEDs performs better during daylight hours. The use of such existing technologies allows for the display screen 102 to be monochromatic or capable of displaying colors.

The display screen 102 may display various forms of information. For example, the display screen 102 may provide one or more textual messages at a time, with each written in one or more languages. Additionally, the display screen 102 may provide graphical elements such as stop signs and arrows pointing in various directions. Furthermore, the text and graphics being displayed may be static or may be animated.

The display screen 102 may be of various sizes and shapes depending upon the particular situation, but it may be desirable for the display screen 102 to be large enough so that textual information can be seen at a distance. This allows motorists to view content while approaching an intersection, such as where the content is emergency vehicle information that motorists should read even before the traffic light has become red. As one example of an appropriate shape and size, the display screen may have a height about the same as the height of traffic lights while having a width that spans the majority of the distance between two adjacent traffic lights aimed for a given direction of travel. Thus, the screen 102 may be placed in very close proximity to the traffic lights so as to be easily observable by motorists who look toward the traffic lights.

The optics and position of the display screen 102 may be oriented so that it is difficult or impossible to view the display screen 102 from a steep angle. This prevents motorists approaching from other directions from being distracted by the display screen 102 since these motorists may have a green light and usually should not be distracted. Various display technologies such as those referenced above may be configured to direct the visible light from the display directly forward rather than to the side to prevent the display screen 102 from being visible to motorists not directly facing the screen 102.

A computer 104 is also included as a component of the traffic display system 100. The computer 104 generates the display signal that drives the display screen 102 to display particular content. Therefore, the computer 104 is in control of what content is displayed and when it is displayed. The timing for display of particular content may be based on a time of day provided by an internal clock 108, such as where a particular advertisement is to be displayed between certain hours of the day. For example, a lunch special of a local restaurant for a particular day may be displayed during the lunch hours of that day.

The timing may also be based on timing signals that are used to control the traffic light 134 so that the display is coordinated with the traffic light. As one example of coordinating the sign display with the traffic light, using the timing signal that controls the traffic light 134 allows for the content to be displayed only during particular phases of the traffic light 134. For example, it may be desirable to only display advertising and other more distracting information to motorists during red lights when the motorists have presumably brought their vehicles to a stop. Similarly, during green lights, useful but non-distracting information may be displayed such as the name of the cross-street. Also, the sign may provide words such as "Stop" and "Drive Carefully" that coincide with the traffic light providing red and green lights, respectively. The timing signals that control the traffic light 134 may be generated by an external control system (not shown) that provides the timing signal to the computer 104 as input 136. Additionally, the input 136 may simply be parallel connections to the individual red, yellow, and green lights of the traffic light so that the same circuit that turns on the red light also indicates to the computer 104 that the red light is active. As an alternative, the computer 104 may also serve as the controller for the traffic light 134 so that the control of the traffic light 134 is logically linked to the control of the display screen 102.

As another example of coordinating the sign display with the traffic light, the computer 104 may also track the time until a phase change of the traffic light occurs. For example, the computer 104 may be programmed with data specifying that at certain times of day, each phase of the traffic light has a particular duration. Then, upon detecting a change, the computer 104 may utilize the clock 108 to continuously determine the time remaining before the next phase change. This remaining time allows the computer 104 to be proactive in controlling what is being displayed as opposed to being entirely reactive to input 136 providing a phase change. Additionally, this allows the computer to generate a countdown to the next phase change that may be displayed on at least a portion of the display screen 102, either alone or in combination with other content. Thus, motorists may be made aware of when a red light will change to green, or the time remaining until a green light changes to yellow.

In addition to receiving input 136 from the traffic light, the computer 104 may also receive input 140 from an emergency vehicle system 138. The emergency vehicle system 138 includes a receiver 142 that may receive a specially encoded signal (for example, infrared light) generated by a transmitter 146 of an emergency vehicle 144. The encoded signal is received once the emergency vehicle has traveled within range of the receiver 142, which is located at the intersection where the traffic light 134 and display screen 102 are located. Upon receiving the encoded broadcast, the emergency vehicle system 138 provides a display instruction as input 140 to the computer 104, and the computer 104 then provides an appropriate display on display screen 102. As discussed below with reference to FIGS. 7-9B, the display may warn motorists as well as provide driving instructions through textual and/or graphical information.

To provide content for the display screen 102, the computer 104 includes memory 106 that stores the content to be provided and any programming necessary for the behavior of the computer 104, such as the timing information for display of a particular advertisement. Thus, the computer 104 accesses the memory 106 to determine when to provide content and what content to provide. Accordingly, the computer 104 can be programmed to provide content by sending information to the computer 104 that specifies the timing for content as well as the content itself. The computer 104 may also be configured to display content by default on a random basis or on a predetermined rotation where specific timing information is not provided. The computer 104 references the memory 106 to determine the appropriate warning and driving instruction to be immediately displayed in response to the display signal via input 140 from the emergency vehicle system 138.

To maintain the operations of the traffic display system 100, a backup battery 110 may be included to provide electrical power upon power being lost from the public utilities. At a minimum, this backup battery 110 provides sufficient power to allow a communications interface, such as a cellular interface 114 discussed below, to provide notification of the problem. Optionally, this backup battery 110 also allows the display screen 102 to continue providing content and also allows the computer 104 to continue providing display signals to the screen 102 and to continue receiving programming from external sources. Thus, advertising may continue but more importantly, displays of warnings and instructions related to approaching emergency vehicles may also continue to be displayed. Most importantly, where the computer 104 controls the traffic light 134, the backup battery 110 allows for the continued operation of the traffic light 134 during power outages.

To provide programming from external sources, the traffic display system 100 includes an interface to a communications network. The interface to the communications network may be of various forms. For example, a network connection may be provided through the telephone network (e.g., via dial-up modem or digital subscriber line modem) or though the cable television network (e.g., cable modem). The network connection may then be accessible from a user interface 118 that a programmer may interact with to send the programming to the programmable sign display from virtually any remote location. To reduce the burden associated with providing a dedicated land-line based communication network to program and otherwise control the one or more programmable sign displays, the traffic display system 100 may include a wireless interface to allow the traffic display system 100 to communicate wirelessly with a communications network that distributes programming to the traffic display system 100.

As shown in the embodiment of FIG. 1, the interface of the traffic display system 100 is a combination of an authentication system 112 and a wireless interface, which is shown as a cellular interface 114 in this example. The cellular interface 114 of this example connects wirelessly through a cellular telephone network 116 to a backend system that includes the user interface 118. This exemplary cellular telephone network configuration setup is discussed in more detail with reference to FIGS. 2 and 3 below. It will be appreciated that other variations of a wireless interface are also applicable. For example, for short range communications, a Wi-Fi connection such as the Institute for Electrical and Electronics Engineers ("IEEE") 802.11 wireless interface may be utilized. Furthermore, it will be appreciated that for examples employing a long range cellular interface, one of several variations may be used such as code division multiple access ("CDMA") or global system for mobile communications with general packet radio service ("GSM/GPRS").

The communications interface may also be bi-directional such that the traffic display system 100 can initiate sending a message back to the programmer through the communications network to report events. For example, the computer 104 may detect malfunctions of the display system such as loss of memory, loss of utility power requiring the backup 110 to takeover, loss of timing from a traffic light controller, etc. The computer 104 may utilize the wireless interface to the network 116 to send a message indicating the malfunction such as through a predetermined error code. The programmer may then receive the message at a computer or other digital device providing a user interface 118 in the form of a text message or computer generated audible message.

A remote programming service 120 may act as a managing entity to receive content from clients and coordinate programming of the content into the programmable sign display system 100. The remote programming service 120 may sell advertising space and time on the display to advertisers 130 and/or government agencies 132. The remote programming service 120 then sends programming to the programmable sign display system 100 where it is stored in memory 106 and executed by the computer 104. The remote programming service 120 may charge customers based on the frequency that content is displayed, the length of time the content is displayed, the time of day that the content is displayed (e.g., higher rates during rush hour traffic) the amount of space taken by the content, etc. The remote programming service 120 may then coordinate all of the advertising by generating programming that controls the content to be displayed, the size and location of the content on the display, and the timing of display of the content.

Furthermore, the remote programming service 120 may utilize broadcast radio in conjunction with the programmable sign display system 100. In addition to selling advertising time and space on the sign, the programming service 120 may also sell broadcast time, or may operate in conjunction with a broadcast company, to broadcast advertisements or other information while displaying related information on the programmable sign display 102. The information to be broadcast is conveyed to the broadcast radio 124 through any channel of communication 122, such as over a data network or through a telephone call. For example, the display 102 may instruct motorists 152 to tune the radio receiver 150 of their vehicle 148 to a particular radio frequency on which the broadcast radio 124 is sending out a signal 128 from an antenna 126. Motorists may then hear the advertising or other information in addition to viewing information on the display 102.

While these various systems described above may be present together and may work in conjunction as shown in FIG. 1, it will be appreciated that each of the systems may be present and work independently from others to convey information to motorists through the programmable sign display system 100. Accordingly, these various systems are described separately and in more detail below with reference to FIGS. 2-10.

Figure 2:
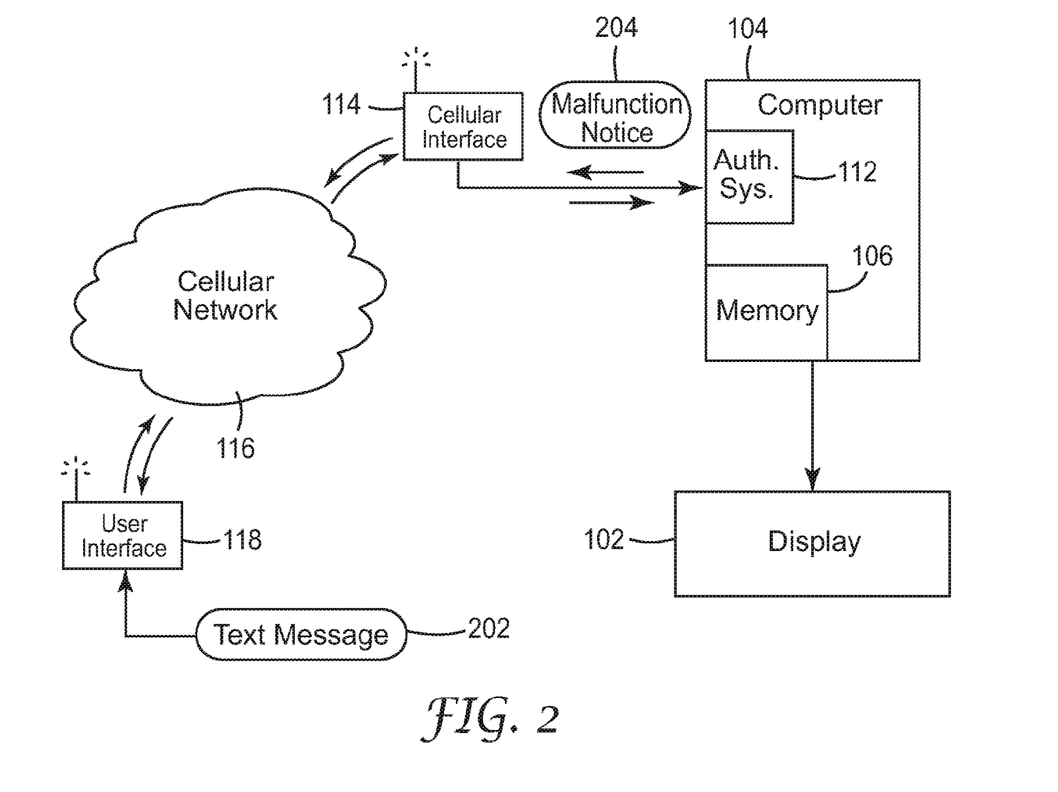
FIG. 2 illustrates the use of a cellular interface and cellular telephone network as an exemplary wireless system to convey programming to the programmable sign display such that a dedicated network is not necessary.

FIG. 2 shows the bi-directional communications between the computer 104 and the user interface 118 of the programmer using a wireless connection, such as the cellular telephone network 116 shown in this example, as the communication medium. Accordingly, because most areas are serviced by a cellular telephone network, a Wi-Fi hot spot, or other wireless medium, it is not necessary to provide a dedicated communication network to the programmable sign display system 100 to enable programming to be sent from a remote location. Instead, the programmer may enter a text message 202 into the user interface 118, such as a telephone keypad or a touch screen, and send the text message to a text message address assigned to a cellular interface 114 interconnected to the computer 104.

The text message is conveyed through the wireless medium, such as the cellular telephone network 116 of this example, in the conventional fashion and is received at the cellular interface 114. The cellular interface 114 may then be accessed by the computer 104 to retrieve the text message. The computer 104 then extracts the programming information of the text message 202 and stores the retrieved message in memory 106 where it can then be added to the schedule of content to be displayed on display screen 102. The text message 202 may provide the textual content as well as additional information such as identification of a standard graphical element, location of content, timing of content, etc. via alphanumeric control codes recognizable by the computer 104.

Alternatively, programming may be delivered from the user interface 118 via voice commands that are then received at the cellular interface 114 and are conveyed into a speech recognition application of the computer 104. As with a text message, voice commands may include the textual content of a message, identification of standard graphical elements, location of content, timing of content, etc. via spoken control codes or codes entered as tones through the keypad of the user interface 118.

In any of the manners of transferring programming, the computer 104 may employ an authentication system 112 to ensure that the programming is being received from an authentic and recognized sender as opposed to an outsider who might have malicious intentions. The authentication system 112 may, for example, request that a particular passcode be presented, either as a header to a text message or at the beginning of voice transmissions. The passcode that is received via a text message, via tones entered through the keypad, or spoken is then compared to a reference passcode to determine whether the sender is authentic. The particular passcode that is entered may also correspond to a reference passcode that has certain permissions assigned, such as permissions allowing the programmer to supplement content but not remove content from the display schedule.

In addition to the computer 104 receiving programming through a wireless interface, the computer 104 may also initiate calls or messages through the wireless interface to the wireless communications medium to report information. For example, malfunctions of the computer 104, the sign display 102, the traffic light 134, or the emergency vehicle system 138 may be detected and relayed back to the user interface 118 of the programmer as a malfunction notice 204. This may shorten the response time needed to repair the malfunction and restore normal operation of the systems.

The report sent from the computer 104 may be sent in various formats. For example, the report may be an error code that is sent via a text message initiated on the cellular (or other wireless) interface 114 that is addressed to the text message address of the user interface 118. Likewise, a voice call to the user interface 118 may be placed from the cellular (or other wireless) interface 114 and a speech generator may provide a spoken report to the programmer.

Figure 3:
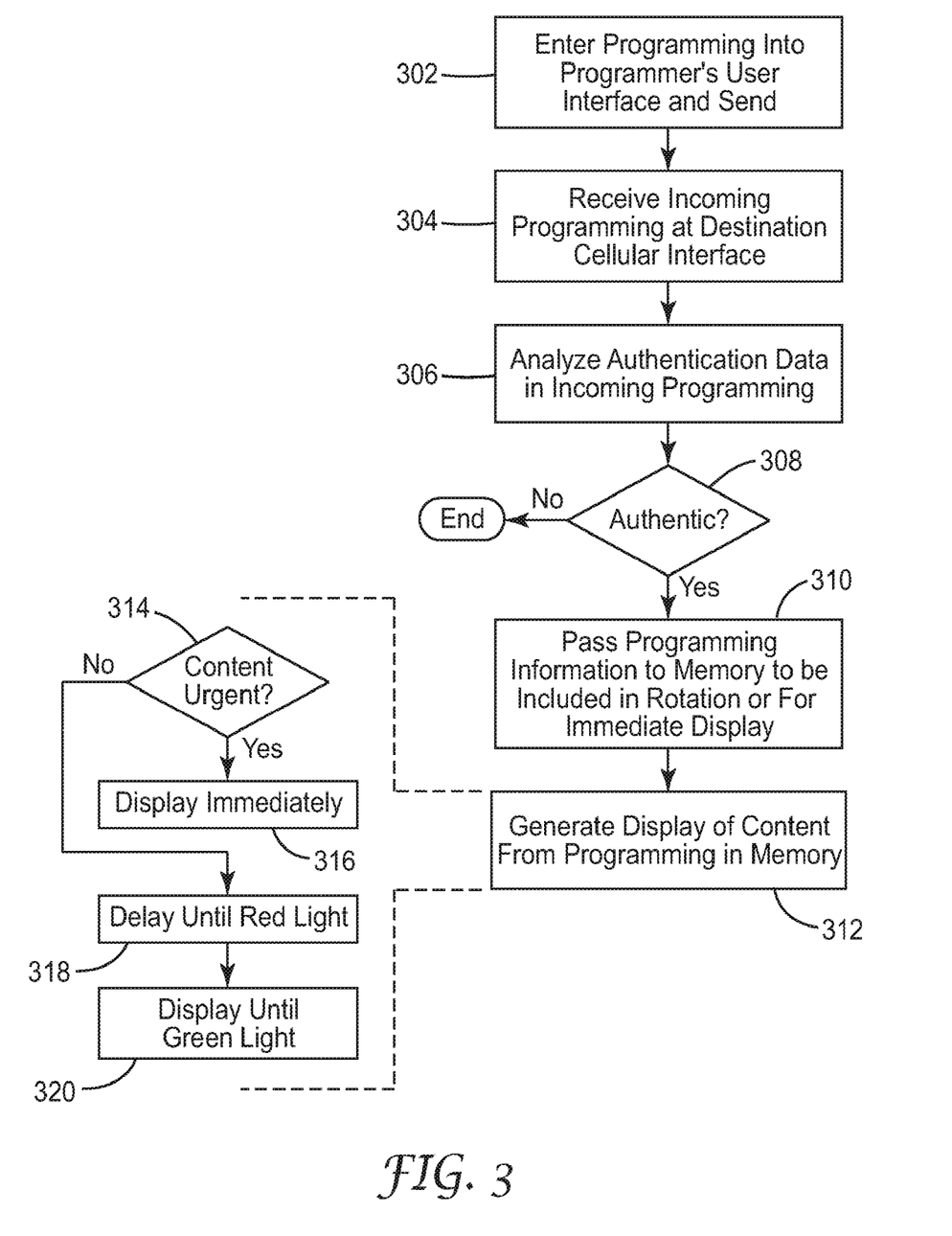
FIG. 3 illustrates the logical operations to program the sign through the exemplary cellular telephone network and then provide content on the display in accordance with the programming.

FIG. 3 shows logical operations that are involved in sending programming to the programmable sign display system 100 and logical operations that are involved in implementing the programming. The logical operations begin at entry operation 302 where the programmer enters the programming information into a user interface 118, such as through a text message or voice command as described above, and the programming information is sent through the wireless communication network to the destination cellular or other wireless interface 114. At reception operation 304, the destination cellular interface 114 receives the incoming text message or voice call.

Once received, the authentication system 112 then analyzes the passcode of the incoming data of the text message or analyzes the keyed or spoken passcode of the voice call at authentication operation 306. The analysis involves comparing the received passcode to a reference passcode that is maintained in memory of the computer. Query operation 308 then detects whether the incoming message has been authenticated by finding a match to a reference passcode. If not, then the transfer terminates without the programming being installed into memory 106.

If authentication has occurred, then the programming information is extracted from the message and passed on to the memory 106 at storage operation 310. The programming is extracted by identifying the portion specifying the content to be displayed, the code indicating the position, the code indicating timing, the code indicating graphical elements, etc. The programming information that has been extracted is saved to memory 106 so as to be included in the rotation of content, or to be displayed immediately if flagged as emergency/urgent information. The content corresponding to the received programming is then displayed on the programmable sign display 100 by the computer 104 accessing the programming stored in memory 106 at the designated time at display operation 312.

When determining whether to display content at display operation 312, it may be desirable to follow the logical operations beginning at query operation 314 to avoid distracting motorists while their vehicles are in motion. At query operation 314, it is determined whether the content is non-urgent information such as advertising or certain public service announcements (e.g., traffic reports, community events, safety tips, missing person alerts such as Amber alerts in the U.S., time, date, temperature, weather forecast, etc.) or whether it is urgent information such as a warning for a flooded roadway ahead. This indication of urgent versus non-urgent may be specified by a control code included in the programming submitted to the computer. If the content is determined to be urgent (e.g., emergency broadcast system notifications) such that it is for immediate display, then operational flow proceeds to display operation 316. However, if the content is advertising or other non-urgent information, then operational flow proceeds to delay operation 318 where the content is queued for display but withheld until the traffic light turns red. Then, at display operation 320 after the light has turned red, the content is displayed until the traffic light turns green or until a pre-set amount of time for the content expires.

Figure 4:
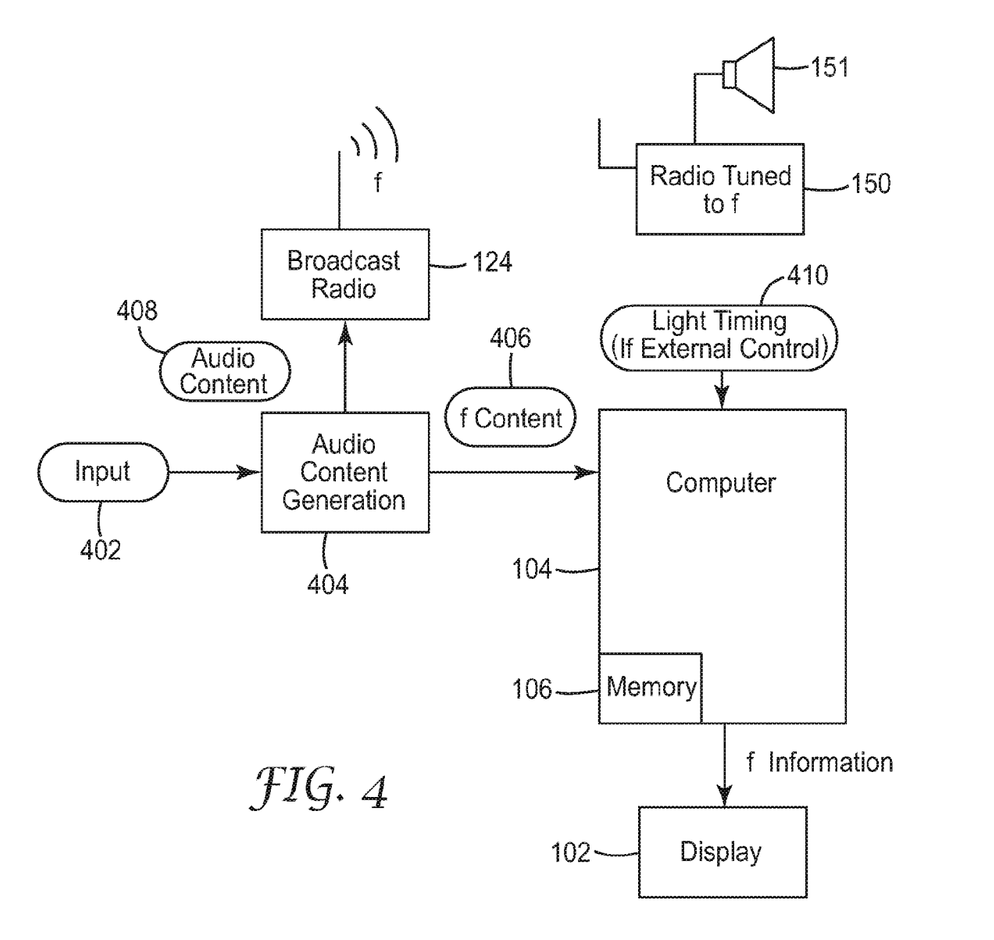
FIG. 4 illustrates a radio broadcast occurring in conjunction with a display of a radio frequency of the broadcast on the programmable sign display.

FIG. 4 shows the components of the system for providing radio broadcasts in conjunction with the programmable sign displays. Input 402 includes any textual or graphical advertising or other information such as public serviced announcements to be displayed on the sign along with any verbal advertising or other verbal information (e.g., emergency system broadcasts) to be broadcast. Audio content 408 is then generated by audio content generation system 404, and the audio content 408 is provided to the broadcast radio transmitter 124. The audio content generation system 404 may involve voice talent recording verbal messages to a recording medium to be later played back through a broadcast transmission or may involve live voice talent transmissions.

The broadcast radio transmitter 124 may broadcast on a frequency f to provide the audio messages to radio listeners. The messages provided may include advertisements or public service announcements such as traffic reports or emergency system broadcasts. As noted below, these messages may be coordinated with content on the programmable sign displays. Furthermore, the audio broadcasts may provide audio that corresponds to and is in synchronization with full-motion video being provided on the sign displays to further inform and entertain motorists.

In addition to generating audio content, programming 406 is sent to the computer 104 to be saved in memory 106 for repeated display on the display screen 102. The programming includes a textual description of the radio frequency that motorists may tune in to hear relevant broadcasts. The programming 406 may instruct the computer 104 to display the notice of the broadcast frequency for the audio content along with other advertisements and/or public service information being provided. Additionally, the computer 104 may be responsive to traffic light timing signals 410 to control when the displays of the radio frequency and related content will occur, such as only during red lights for content that is advertising.

The radio broadcasts are received at the radio receiver 150 of motorists once the radio receiver 150 has been tuned to the proper frequency. The radio receiver 150 then drives audio speakers 151 to produce audible signals in the vehicle. Accordingly, motorists may view the displayed frequency and any associated message, decide to tune in the relevant radio broadcast, and then listen to the audible information while sitting at a red light at the intersection as well as driving away from the intersection once the traffic light changes to green.

The broadcast radio transmitter 124 may be a standard high-power, long range radio transmission system customarily used by radio stations, and the broadcast radio transmitter 124 may be located remotely from the intersection where the display 102 and traffic light is located. Accordingly, the audio messages being broadcast may not necessarily be limited to information specifically relevant to a particular intersection or city block. However, in certain embodiments, the broadcast radio 124 may be a limited power, short range radio transmission system that has a range of only one or two city blocks, and the broadcast radio transmitter 124 is located such that the display 102 and traffic light are within the effective broadcast range. In that case, the information that is provided on the radio broadcast may be limited to information that is immediately relevant to the motorists within range of the radio transmission. Accordingly, merchants may receive an increased value in purchasing such airtime and sign space by having the advertisements limited to those merchants within the small area served by the traffic light.

It should be noted that such radio communications are typically governed by a government agency, such as the Federal Communications Commission ("FCC") of the U.S. Accordingly, there may be restrictions placed on the particular content that may be provided on a particular frequency. Furthermore, there may be restrictions on the use of short range broadcasts such as those used for coverage of only a few city blocks. Therefore, applicable regulations should be observed prior to providing such radio broadcasts in conjunction with sign displays at traffic lights.

While a single radio transmitter providing audio content on a single radio frequency is shown in FIG. 4, it will be appreciated that multiple radio transmitters may transmit audio content on different frequencies. In that case, the audio content of one frequency may be relevant to certain sign displays within the broadcast area while audio content of another frequency is relevant to other sign displays within the broadcast area. Furthermore, a given programmable sign display may be programmed to indicate one frequency at one time while indicating another frequency at another time.

Figure 5:
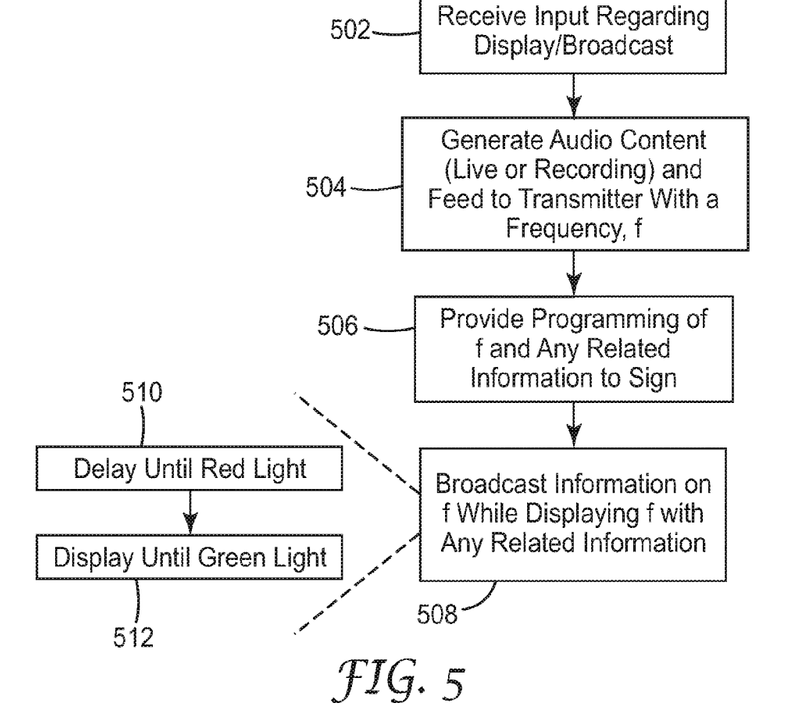
FIG. 5 illustrates the logical operations to cause the radio broadcast in conjunction with the display of the radio frequency.

FIG. 5 shows the logical operations that bring about the simultaneous sign display and corresponding radio broadcast. The logical operations begin by receiving input regarding the display and broadcast including the content of the message, whether it is advertising or a public service announcement at input operation 502. Then at content operation 504, the audio content for the radio broadcast is generated based on the received input and is provided to the radio transmitter 124 (or to the operators thereof). It may be desirable to have mirrored broadcasts on an AM frequency as well as on an FM frequency.

Additionally, the audio content may be provided to the radio transmitter 124 either for immediate broadcast or for placement into a queue for later broadcast. The audio content may be provided with designated broadcast times so that the audio content is broadcast when most appropriate. For example, it may be most appropriate that certain content be broadcast in synchronization with certain information being displayed by the programmable sign display in proximity to the traffic light.

In addition to providing audio content to the radio transmitter 124, the content to be displayed including the radio frequency itself is programmed into the sign display system 100 at program operation 506. The programming may be conveyed in any one of various ways such as those described above. The programming provides the radio frequency text but may also provide textual and graphical advertising or other information simultaneously. The programming may also provide designated times when the radio frequency and any related information should be displayed.

It may be desirable to display the radio frequency only during times when particular audio content is being broadcast on the radio frequency being displayed. This approach may result in motorists being more likely to hear a particular audio portion being broadcast than another portion, and therefore may provide incentive to advertisers to pay a higher rate where audio content is broadcast simultaneously with related visual content being displayed. This specific scenario is provided for at broadcast operation 508, where the audio content is being broadcast on a radio frequency while the visual content is being displayed during the same period of time.

When displaying the visual content providing the radio frequency and any related information on the programmable sign display system 100, it may be desirable to time the actual display with the phases of the traffic light. For example, the indication of the radio frequency and related information may often be non-urgent information that should only be displayed during the red light phase. Thus, at broadcast operation 508, it may be desirable to implement delay operation 510 where the display of the radio frequency and related information is delayed until a red light occurs. Then, once the red light has occurred, the visual content including the radio frequency is displayed at display operation 512 for a chosen length of time or until a green light occurs.

Figure 6A:
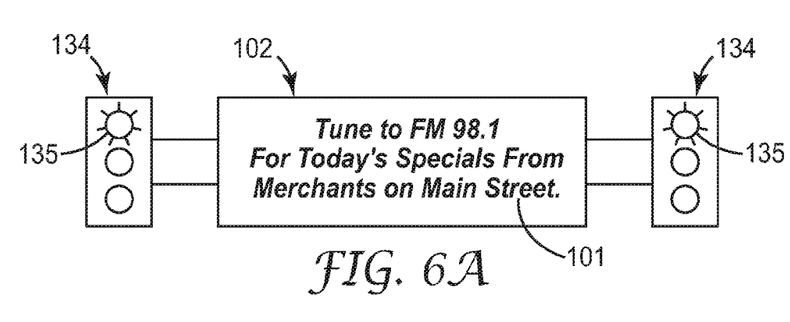
FIGS. 6A and 6B are examples of displays of a radio frequency with related information.
Figure 6B:
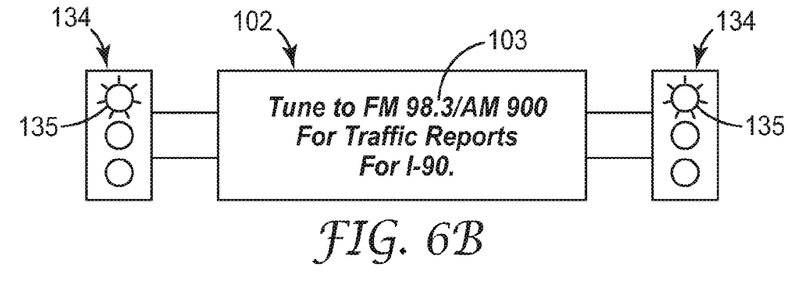

FIGS. 6A and 6B provide examples of the visual content being displayed in conjunction with audio content being broadcast on a radio frequency. In both FIGS. 6A and 6B, the display screen 102 is located in close proximity to two traffic lights 134. The traffic lights 134 are currently in the red light phase, with the red lights 135 active. Therefore, the visual content 101 of FIG. 6A and visual content 103 of FIG. 6B are displayed since it is presumed that motorists have stopped their vehicles and are at least occasionally glancing toward the traffic lights 134. In one scenario, visual content 101 may be displayed at one red light phase and then visual content 103 is displayed at a subsequent red light phase. As another scenario, visual content 101 may be displayed during a first portion of a red light phase and then visual content 103 is displayed during a latter portion of the same red light phase.

Visual content 101 of FIG. 6A provides a textual indication of a radio frequency that motorists may tune in, specifically FM 98.1, and also provides the related textual message that specials for merchants of Main Street are provided at that frequency. This visual content may be scheduled for display at a time matching the schedule for broadcast of audio content that describes the specials. Therefore, when motorists tune their radio receivers to FM 98.1 in response to viewing the sign, they hear the specials for the merchants on Main Street. Therefore, merchants on Main Street may find significant value in purchasing such coordinated broadcast of audio content with display of visual content.

Visual content 103 of FIG. 6B provides a textual indication of multiple radio frequencies that motorists may tune to, specifically FM 98.3 or AM 900, and also provides the related textual message that traffic reports for 1-90 are provided at those frequencies. Again, this visual content may be scheduled for display at a time matching the schedule for broadcasting the audio content providing the traffic report. Therefore, when motorists tune their radio receivers to FM 98.2 or AM 900 in response to viewing the sign, they hear the 1-90 traffic report. As is typically done, additional advertising may be provided through the broadcast in conjunction with the broadcast traffic report. Thus, advertisers may find significant value in purchasing broadcast airtime for advertisements that coincide with traffic reports. This may especially be the case where the traffic reports are advertised by simultaneous visual content being displayed at traffic lights.

Figure 7:
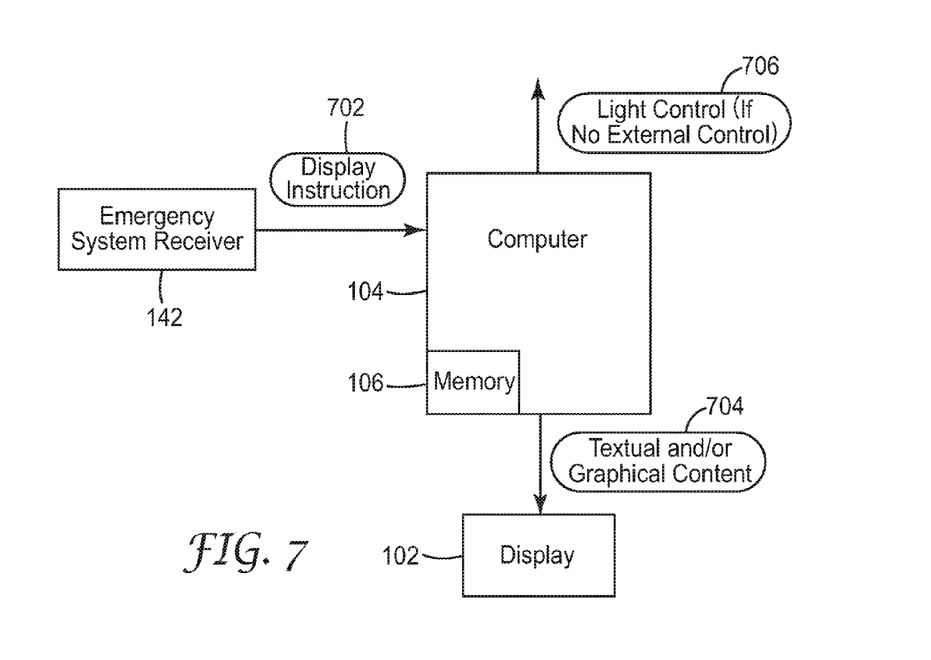
FIG. 7 illustrates the use of the programmable sign display in conjunction with an emergency vehicle warning system.

FIG. 7 shows the components that enable the programmable sign display system 100 to provide information to motorists about approaching emergency vehicles. An emergency system receiver 142 is located in proximity to the traffic light 134 and display screen 102. The receiver 142 is configured to be responsive to encoded signals sent from emergency vehicles that are approaching the intersection where the receiver 142 is located. The receiver 142 responds to the signals from emergency vehicles by generating a display instruction 702 that is provided as input to the computer 104.

This display instruction 702 may be a simple command that triggers the computer 104 to display a standard textual message, graphical message, and/or driving instruction for motorists to see. However, the display instruction 702 may be more elaborate by specifying additional information such as the number of emergency vehicles that are approaching and the direction they are approaching from. The computer 104 may then select an appropriate textual message to display to motorists based on the received instruction. For example, the message may specify the number of emergency vehicles that are approaching, the direction from which they are approaching from the perspective of the motorists, and a driving instruction to assist the motorists in avoiding the emergency vehicles. These aspects to the message may be stored in memory 106 and may be retrieved by referencing the display instruction parameters against the messages in memory 106.

Upon the computer 104 selecting the appropriate message from memory 106, the textual and/or graphical content 704 is provided to the display screen 102 where it is displayed. Because the approaching emergency vehicle is an urgent situation, the computer 104 may be configured to send the content 704 immediately upon receiving the display instruction 702 so that motorists become aware of the approaching emergency vehicle immediately and optionally before the traffic light has changed to red.

In certain embodiments, the computer 104 is also responsible for controlling the traffic light 134. In that case, the computer 104 generates a traffic light control 706 to switch the light from green to yellow and then red to stop traffic within the intersection until the emergency vehicles can pass through. Once the emergency system receiver 142 stops sending the display instruction 702 to thereby indicate that the emergency vehicles have passed through, the computer 104 returns the traffic lights of the intersection to normal operation. The computer 104 may also respond to the receiver 142 terminating the display instruction 702 by returning the display screen 102 to normal operation. This involves removing the emergency vehicle message and then displaying normal messages at the next available time.

Figure 8:
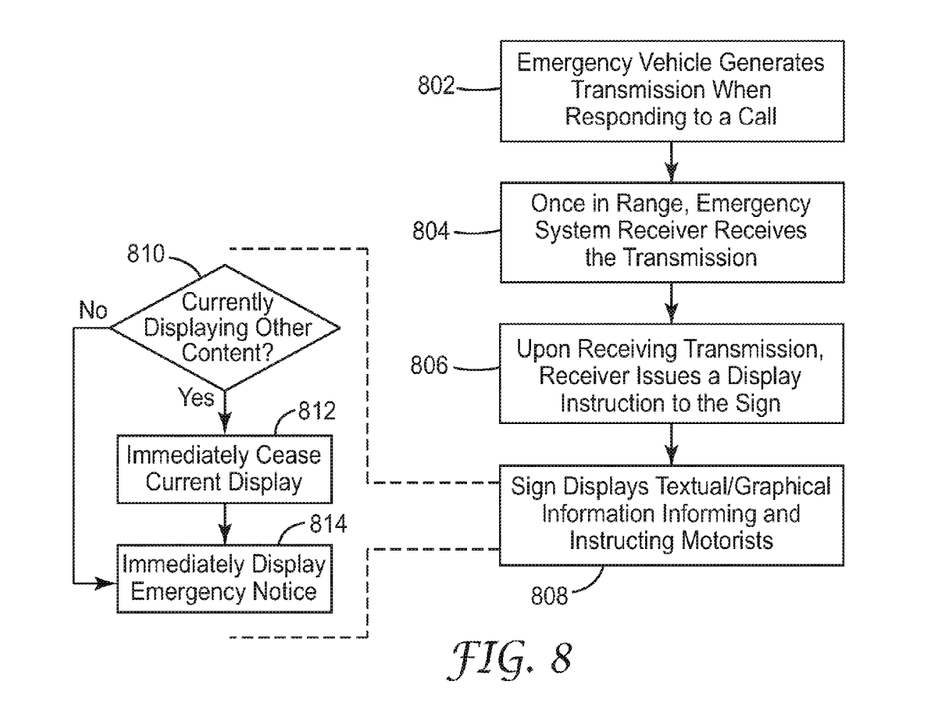
FIG. 8 illustrates the logical operations to provide warnings of approaching emergency vehicles on the programmable sign display.

FIG. 8 shows the logical operations for providing the message on the programmable sign display system 100 that alerts the motorists to the approaching emergency vehicle. The logical operations begin at transmission operation 802 where the emergency vehicle begins transmitting an encoded signal when responding to an emergency. Typically, emergency vehicles automatically begin transmitting such a signal whenever the emergency lights and sirens of the vehicle are activated. Such emergency vehicles generally include police cars, fire engines, and ambulances.

As the emergency vehicle begins to approach the intersection, the signal being transmitted by the emergency vehicle will reach to the emergency system receiver 142 well before the emergency vehicle arrives at the intersection. This provides adequate time for the emergency system receiver 142 and programmable sign display system 100 to generate the message to motorists and for the motorists to respond accordingly. The transmission is initially received by the emergency system receiver 142 at reception operation 804. The display instruction is then generated in response to the transmission at instruction operation 806.

Generating the display instruction may involve simply sending a basic trigger signal or may involve generating a more elaborate data message specifying the details of the approaching emergency vehicles as noted above. The display instruction may identify the number of vehicles as well as the direction that the vehicles are approaching from. For instances where multiple emergency vehicles are approaching the same intersection, the direction of approach for each may vary and the display instruction may provide an indication of each direction.

Once the display instruction has been sent, the computer 104 then generates the display of a message on the sign that corresponds to the information of the display instruction at display operation 808. For a simple trigger, the message displayed might simply state that an emergency vehicle is approaching. The computer 104 may generate a more detailed message for a more elaborate display instruction. The computer 104 references the information provided in the display instruction to determine the appropriate message to display for motorists. For example, a more elaborate display instruction may indicate one emergency vehicle is approaching from the rear relative to certain motorists. The computer 104 then displays the message from memory 106 that is appropriate for that situation.

In addition to providing a message that informs motorists of the approaching vehicle, the message that is displayed may also provide a driving instruction to motorists. The driving instruction may be pre-set for a given intersection. For example, a particular intersection may be designed such that motorists may always crowd toward the right shoulder to provide enough room for an emergency vehicle to pass to the left of the motorists. In that case, the driving instruction may be pre-set to state that motorists should merge to the right.

As an alternative to a pre-set driving instruction, the display instruction from the emergency system receiver 142 may provide an indication of the driving instruction that should be conveyed by the display. For example, the transmission itself from the emergency vehicle may provide the driving instruction. The transmission system may be configured so that the operator of the emergency vehicle may provide input based on how he or she perceives the appropriate action for motorists to take. The input may be a simple left or right instruction to indicate that motorists should crowd to the left or right side of their respective lanes to provide clearance for passage of the emergency vehicle. The driving instruction from the transmission is then conveyed in the display instruction sent to the computer 104, and the computer 104 then selects the message for display that conveys the appropriate driving instruction.

When providing the display of the message at display operation 808 to alert motorists to the approaching emergency vehicle, the computer 104 may also implement the logical operations beginning with query operation 810. At query operation 810, the computer 104 detects whether the sign display is currently displaying other content, such as advertising or a public service announcement. If not, then operational flow proceeds to display operation 814 where the message about the approaching emergency vehicle is immediately displayed. If the sign display is currently displaying other content, then operational flow proceeds to stop operation 812 where the computer 104 immediately removes all current content from the sign display. Then, operational flow proceeds to display operation 814 where the emergency vehicle message is provided.

Figure 9A:
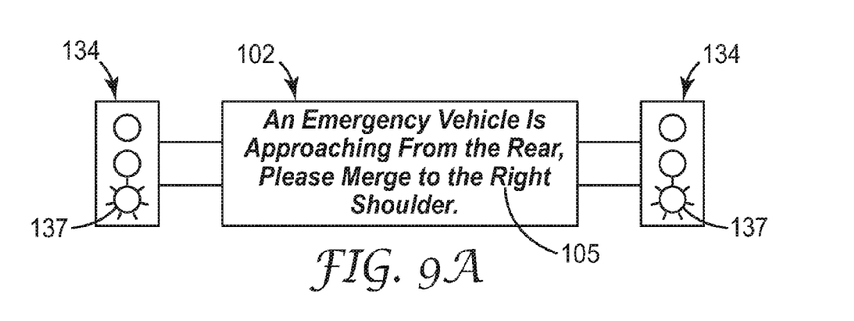
FIGS. 9A and 9B are examples of displays of warnings and instructions regarding the approaching emergency vehicles using textual and/or graphical information in the displays.
Figure 9B:
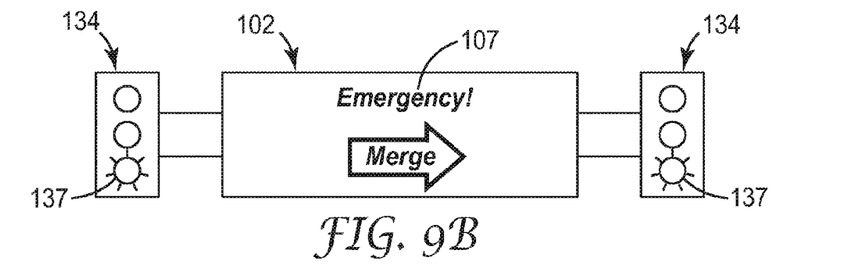

FIGS. 9A and 9B provide examples of the visual content being displayed to alert motorists to the approaching emergency vehicle. In both FIGS. 9A and 9B, the display screen 102 is located in close proximity to two traffic lights 134. The traffic lights 134 are currently in the green light phase, with the green lights 137 active. Thus, the notification about the emergency vehicle is being provided immediately, even before the traffic lights 134 have changed to red. In one scenario, visual content 105 may be continuously displayed until the emergency vehicle is passed through the intersection. In another scenario, visual content 107 is continuously displayed until the emergency vehicle has passed through. As another scenario, visual content 105 may be displayed for a set period followed by the display of visual content 107, and the sign may repeatedly alternate between visual content 105 and visual content 107.

Visual content 105 of FIG. 9A provides a textual indication of the approaching emergency vehicle. Specifically, visual content 105 informs the motorist that an emergency vehicle is approaching the intersection from the rear of the motorist so that the motorist is aware that the emergency vehicle will need to pass directly by the motorist. Additionally, in this example the visual content 105 provides a driving instruction to the motorist which requests that the motorist merge to the right shoulder, presumably because the emergency vehicle will be passing to the left. Accordingly, the motorist may view the sign and then merge to the right to provide a passage for the emergency vehicle prior to the emergency vehicle reaching the intersection. Thus, this may aid the emergency vehicle in quickly maneuvering through intersections and thereby shorten the time required for the emergency vehicle to reach its destination.

Visual content 107 of FIG. 9B provides text and a graphical element to inform motorists of the approaching emergency vehicle and to provide a driving instruction to the motorists. Specifically, the visual content 107 provides the word emergency and includes an arrow pointing to the right with the word merge included within the arrow. Thus, motorists may view the visual content 107 and quickly appreciate that an emergency vehicle is approaching and that the motorist should merge the vehicle toward the right shoulder. For added impact, the arrow and/or words may blink or may be animated and move left-to-right across the display to ensure that motorists are attentive and understand the instruction quickly. Therefore, motorists should be able to merge out of the passageway of the emergency vehicle prior to the emergency vehicle reaching the intersection, and this aids the emergency vehicle in quickly passing by and shortens the overall response time.

Figure 10:
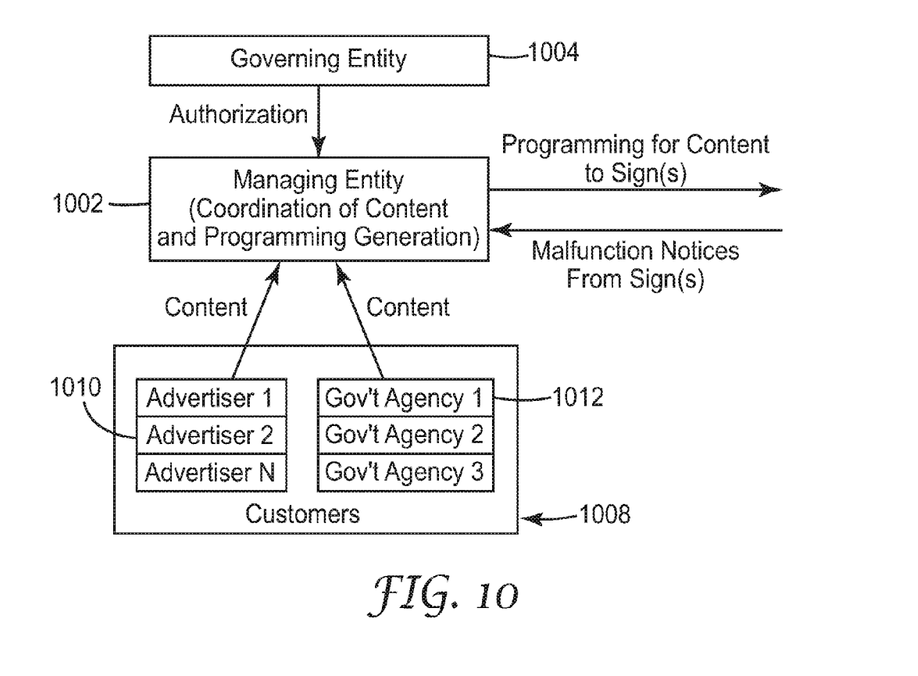
FIG. 10 illustrates a managing entity providing a programming service to customers to coordinate the display of content on the programmable sign display.

FIG. 10 represents a programmable sign display remote programming service 120 of FIG. 1. The service 120 is provided by a managing entity 1002 that receives content to be displayed on the sign and who programs the sign to coordinate the display of content received from various customers 1008 that is to be displayed on one or more sign displays located at one or more intersections. While a government entity 1004 such as a department of transportation typically owns and operates the traffic lights where the programmable sign displays are located, the government entity 1004 may choose not to provide signs and/or related programming services. Instead, the governing entity 1004 may grant authorization to the managing entity 1002 to install and operate the programmable sign displays in proximity to, as well as in coordination with the traffic lights at one or more intersections. The governing entity 1004 may specify regulations for the display sign size, location, content, hours of operation, coordination with traffic lights, etc., which the managing entity 1002 is expected to follow.

The grant of authorization from the governing entity 1004 to the managing entity 1002 may require that the managing entity 1002 compensate the governing entity 1004. For example, a fixed rent may be charged for the space or a fee may be based on a percentage of advertising income that the managing entity 1002 receives. Thus, the grant of authorization may occur as a result of a bartered exchange between the managing entity 1002 and the governing entity 1004.

The managing entity 1002 may then offer its display services to customers 1008, including both commercial advertisers 1010 and government agencies 1012. The customers provide their content, such as the text to be included in a message, to the managing entity 1002. The managing entity 1002 then coordinates the timing, location, etc. of the messages. The managing entity 1002 generates the programming corresponding to the coordinated message displays and provides the programming to the computer 104 in various ways, such as by those methods described above.

The managing entity 1002 receives and coordinates the content and provides corresponding programming to the sign display in exchange for compensation from the customers 1008. Thus, the display of content for the customers 1008 is a result of bartered exchanges between the managing entity 1002 and the customers 1008. The managing entity 1002 may devise various rates for providing the display of content that are based on multiple factors. The factors that may be considered in offering a rate include but are not limited to the amount of content to display, the frequency the content is displayed, the time of day when the content is displayed, whether there is audio content being broadcast simultaneously with the display of content, and the particular intersections where the content is to be displayed.

In addition to providing programming to the sign display, the managing entity 1002 may also receive malfunction notices generated by the sign display. The managing entity may then respond as necessary to maintain and repair the sign display. Accordingly, neither the customers 1008 nor the governing entity 1004 are responsible for the programming, maintenance, and repairs of the sign display. In turn, the managing entity 1002 expects to collect significantly more in fees paid by customers 1008 than the total expenses from gaining authorization from the governing entity 1004 and from programming, maintaining, and repairing the sign displays.

While the invention has been particularly shown and described with reference to various embodiments thereof, it will be understood by those skilled in the art that various other changes in the form and details may be made therein without departing from the spirit and scope of the invention.

What is claimed is:

1. A method of providing visual information to motorists on a programmable sign display placed in proximity to a traffic light having the ability to signal a plurality of colors, one of which is red, comprising:

receiving, by a managing entity, advertising content to be displayed on the programmable sign display from one or more customers;

sending, by the managing entity, programming to the programmable sign display, the programming corresponding to the content provided by the plurality of customers, and the programmable sign display's location requiring authorization from a government entity; and displaying the advertising content on the programmable sign display in response to the programming received by the programmable sign display and in coordination with the color signaled by the traffic light, for viewing by motorists as they direct their attention toward the traffic light, wherein the display of advertising content on the programmable sign display occurs as a result of a first bartered exchange between the managing entity and the customers, and a second bartered exchange between the managing entity and the government entity.

2. The method of claim 1, wherein the color signaled by the traffic light is the color red.

3. The method of claim 1, wherein the one or more customers comprise government customers and advertising customers.

4. The method of claim 1, further comprising sending, by the programmable sign display, a notice of power loss upon occurrence of a loss of power.

5. The method of claim 1, further comprising authenticating, by the programmable sign display, an incoming message from the managing entity.

6. The method of claim 1, further comprising sending, by the programmable sign display, a message that is indicative of a malfunction upon the malfunction of the programmable sign display occurring.

7. The method of claim 1, wherein advertising content is animated content.

* * * * *